US009684883B2

(12) United States Patent
Gooijer et al.

(10) Patent No.: US 9,684,883 B2
(45) Date of Patent: Jun. 20, 2017

(54) INVENTORY MANAGEMENT SYSTEM WITH LATE TRANSACTION PROCESSING

(71) Applicant: Oracle International Corporation, Redwood Shores, CA (US)

(72) Inventors: Steven Irene Andre Gooijer, Maple Grove, MN (US); Charles J. Hahr, Jr., Roberts, WI (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/565,615

(22) Filed: Dec. 10, 2014

(65) Prior Publication Data

US 2016/0171428 A1 Jun. 16, 2016

(51) Int. Cl.
*G06Q 20/00* (2012.01)
*G06Q 10/08* (2012.01)
*G06Q 20/20* (2012.01)

(52) U.S. Cl.
CPC ......... *G06Q 10/087* (2013.01); *G06Q 20/203* (2013.01)

(58) Field of Classification Search
CPC ......... G06Q 10/00; G06Q 10/08; G06Q 40/00
USPC .............................................. 705/28, 44, 37
See application file for complete search history.

(56) References Cited

U.S. PATENT DOCUMENTS

| 7,938,324 | B2 | 5/2011 | Tamarkin et al. | |
|---|---|---|---|---|
| 8,401,911 | B1* | 3/2013 | Chu | G06Q 10/087 705/14.51 |
| 8,533,074 | B1* | 9/2013 | Ehrhardt | G06Q 10/083 705/22 |
| 8,965,796 | B1* | 2/2015 | Gala | G06Q 20/203 705/28 |
| 2002/0091593 | A1* | 7/2002 | Fowler | G06Q 10/087 705/28 |
| 2003/0187714 | A1* | 10/2003 | Perry, III | G06Q 30/0605 705/26.2 |
| 2003/0216969 | A1* | 11/2003 | Bauer | G06K 7/0008 705/22 |
| 2003/0220850 | A1* | 11/2003 | Chu | G06Q 10/087 705/28 |
| 2004/0128224 | A1* | 7/2004 | Dabney | G06Q 30/08 705/37 |
| 2004/0243485 | A1* | 12/2004 | Borenstein | G06Q 30/02 705/26.61 |
| 2005/0171856 | A1* | 8/2005 | Takahashi | G06Q 10/063 705/330 |
| 2006/0282319 | A1* | 12/2006 | Maggio | G06Q 30/02 705/14.19 |

(Continued)

*Primary Examiner* — Seye Iwarere
(74) *Attorney, Agent, or Firm* — Miles & Stockbridge P.C.

(57) ABSTRACT

An inventory management system processes late transactions. The system takes snapshots of stock counts recorded in an accounting system and receives a transaction record after taking the snapshots. The system then determine whether there is an open stock count corresponding to the transaction record and whether the snapshots include a snapshot of the open stock count. When the open stock count and the snapshot exist, the system writes the transaction record to a staging table. Then, upon proceeding from a first phase to a second phase of a plurality of stock count phases, the system updates the snapshot based on the staging table. The stock count phases include a count phase, a recount phase, and an authorize phase.

20 Claims, 4 Drawing Sheets

(56) References Cited

U.S. PATENT DOCUMENTS

| | | | |
|---|---|---|---|
| 2007/0050229 A1* | 3/2007 | Tatro | G06Q 10/087 705/15 |
| 2008/0040151 A1* | 2/2008 | Moore | G06F 19/322 705/2 |
| 2008/0162395 A1* | 7/2008 | Pfeifer | G06Q 10/10 706/47 |
| 2008/0243646 A1* | 10/2008 | Stein | G06Q 10/087 705/28 |
| 2008/0255968 A1* | 10/2008 | Heinrichs | G06Q 10/087 705/28 |
| 2009/0144178 A1* | 6/2009 | Barwick | G06Q 10/0875 705/28 |
| 2010/0138281 A1 | 6/2010 | Zhang et al. | |
| 2010/0262453 A1* | 10/2010 | Robinson | G06Q 10/08 705/330 |
| 2010/0262521 A1* | 10/2010 | Robinson | G06Q 10/08 705/29 |
| 2011/0173028 A1* | 7/2011 | Bond | G06Q 10/08 705/3 |
| 2012/0143733 A1* | 6/2012 | Kappauf | G06Q 30/04 705/32 |
| 2012/0316987 A1* | 12/2012 | DeBusk | G06Q 10/08 705/26.8 |
| 2013/0337789 A1* | 12/2013 | Johnson | H04W 4/02 455/414.1 |
| 2014/0164369 A1* | 6/2014 | Nichols | G06F 17/30536 707/725 |
| 2014/0258051 A1* | 9/2014 | Bostwick | G06Q 20/203 705/28 |
| 2014/0310026 A1* | 10/2014 | Balthazar | G06Q 40/08 705/4 |
| 2015/0127478 A1* | 5/2015 | Westby | G06Q 10/087 705/26.1 |
| 2015/0363898 A1* | 12/2015 | Tsai | G06Q 50/165 705/315 |
| 2016/0110679 A1* | 4/2016 | Putnam | G06Q 10/087 705/28 |
| 2016/0171428 A1* | 6/2016 | Gooijer | G06Q 20/203 705/28 |

* cited by examiner

INVENTORY MANAGEMENT SYSTEM WITH LATE TRANSACTION PROCESSING

FIELD

One embodiment is directed generally to a computer system, and in particular, to an inventory management computer system.

BACKGROUND INFORMATION

Inventory management includes specifying quantities of stocked goods. It is required at different locations within a facility or within many locations of a supply network. The scope of inventory management includes replenishment lead time, carrying costs of inventory, asset management, inventory forecasting, inventory valuation, inventory visibility, future inventory price forecasting, physical inventory, available physical space for inventory, quality management, replenishment, returns and defective goods, and demand forecasting. Balancing these competing requirements leads to optimal inventory levels, which is an on-going process as the business needs shift and react to the wider environment.

Inventory management for a retailer involves seeking to acquire and maintain a proper merchandise assortment, while ordering, shipping, handling, and related costs are kept in check. It also involves systems and processes that identify inventory requirements, set targets, provide replenishment techniques, report actual and projected inventory status, and handle all functions related to the tracking and management of material. Inventory management is a crucial aspect of a retail business since keeping accurate track of the available stock can, for example, prevent lost sales opportunities caused by out of stock items.

SUMMARY

One embodiment is a system that performs inventory management for late transaction processing. The system takes snapshots of stock counts recorded in an accounting system, and receives a transaction record after taking the snapshots. The system determines whether there is an open stock count corresponding to the transaction record, and whether the snapshots include a snapshot of the open stock count. When the open stock count and the snapshot exist, the system writes the transaction record to a staging table. Upon proceeding from a first phase to a second phase of a plurality of stock count phases, the system updates the snapshot based on the staging table, where the plurality of stock count phases include a count phase, a recount phase, and an authorize phase.

DETAILED DESCRIPTION

One embodiment provides late transaction processing for inventory management by using a staging table. In one embodiment, late posted transactions are recorded in a staging table for a period of time, and then corresponding adjustments to the stock count snapshot are applied only at specific intervals during the counting process, for example, when comparing the accounting stock and the physical stock. Accordingly, since adjustments are not applied continuously but only at certain intervals, embodiments can enable stock counts at all times including during business hours while at the same time avoiding excessive user lockouts. Further, embodiments remove the need to lock down all data before the count starts.

Figure 1:
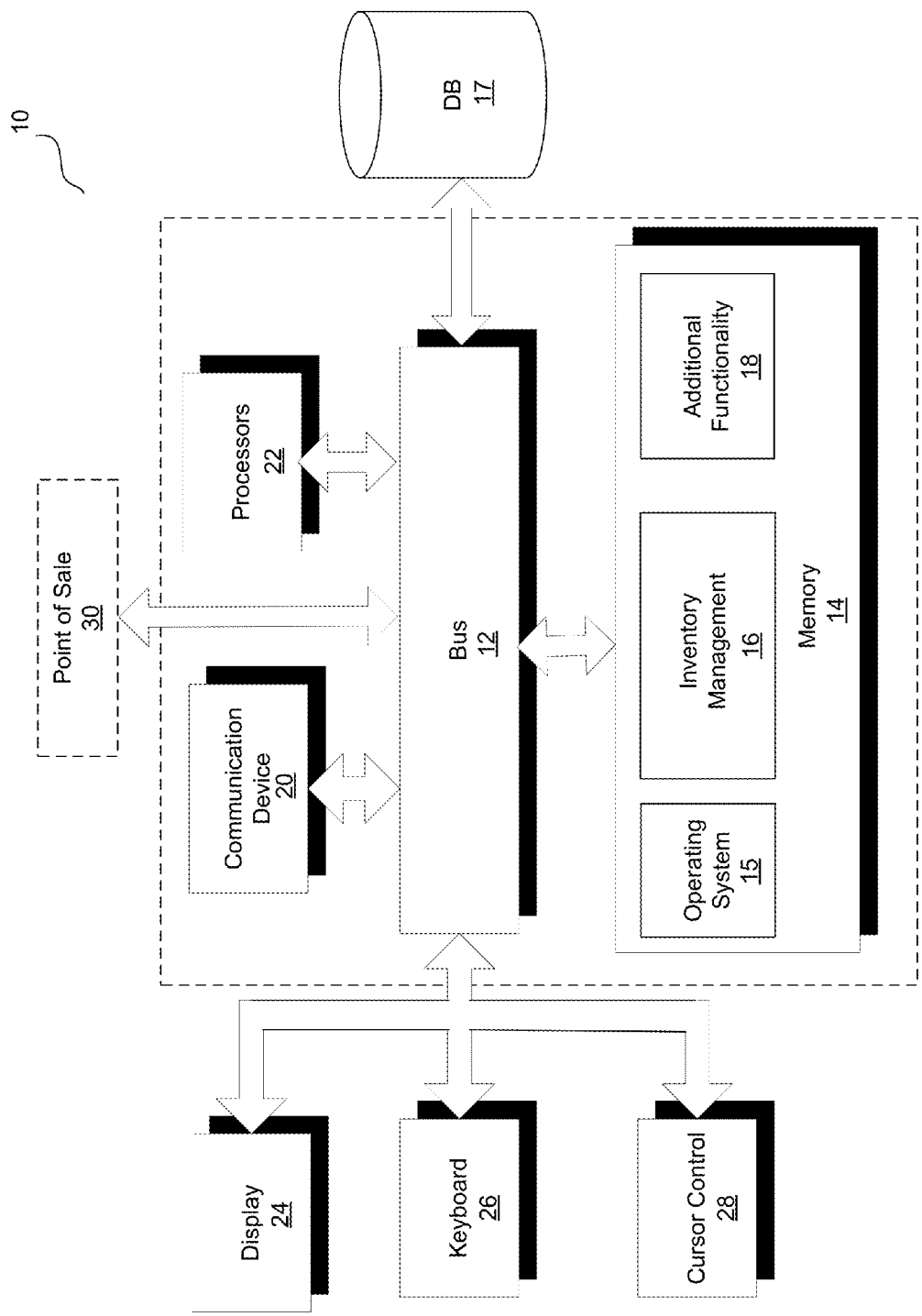
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include an inventory management module 16 for providing late transaction processing, and all other functionality disclosed herein. System 10 can be part of a larger system, such as added functionality to the "Oracle Retail Store Inventory Management" from Oracle Corp. Therefore, system 10 can include one or more additional functional modules 18 to include the additional functionality. A database 17 is coupled to bus 12 to provide centralized storage for modules 16 and 18.

In one embodiment, computer system 10 may function as, or may communicate with, a point of sale ("POS") device 30 for providing late transaction processing, and all other functionality disclosed herein. POS (also called checkout) is the place where a retail transaction is completed, e.g., a point at which a customer makes a payment to the merchant in exchange for goods or services. At POS, the retailer may calculate the amount owed by the customer, provide options for the customer to make payment, and also normally issue a receipt for the transaction. POS in various retail industries uses customized hardware and software as per their requirements. Retailers may utilize weighing scales, scanners, electronic and manual cash registers, electronic funds transfer at POS ("EFTPOS") terminals, touch screens, and any other wide variety of hardware and software available for use with POS. For example, a grocery or candy store may use a scale at POS, while bars and restaurants may use software to customize the item or service sold when a customer has a special meal or drink request.

Generally, with known inventory management systems, if a retailer performs a stock count while the retailer is open to customers, customers can impact the stock count by purchasing items before or while the stock count is being performed. Accordingly, due to possible accounting processing delays, the book value of these items in the inventory management system may not be updated to reflect the sold or inventory adjusted quantity.

One known solution to this problem is that stock counts are not permitted while the store is doing business. One disadvantage with this known approach is that the stock snapshot that is taken before the start of business hours may not represent accurate information, as the physical stock keeps changing during business hours. A stock snapshot is a snapshot of the recorded values of a stock count in the accounting system, reflecting accounting values of such stock count at the time of taking the snapshot.

Another known solution to this problem is to continuously process sales records and inventory adjustments upon receipt and update stock snapshots accordingly. In these known solutions, each sale or adjustment record is compared to every open stock count and then the stock count is updated for that item. One disadvantage of this solution is that it requires excessive and frequent processing and may result in repeated user lockouts.

In contrast to the known solutions, one embodiment of the present invention provides an inventory application that adjusts the snapshot with the sales and inventory adjustment under specific conditions instead of on a continuous basis and without impacting ongoing business processes such as providing accurate current stock on hand.

Figure 2:
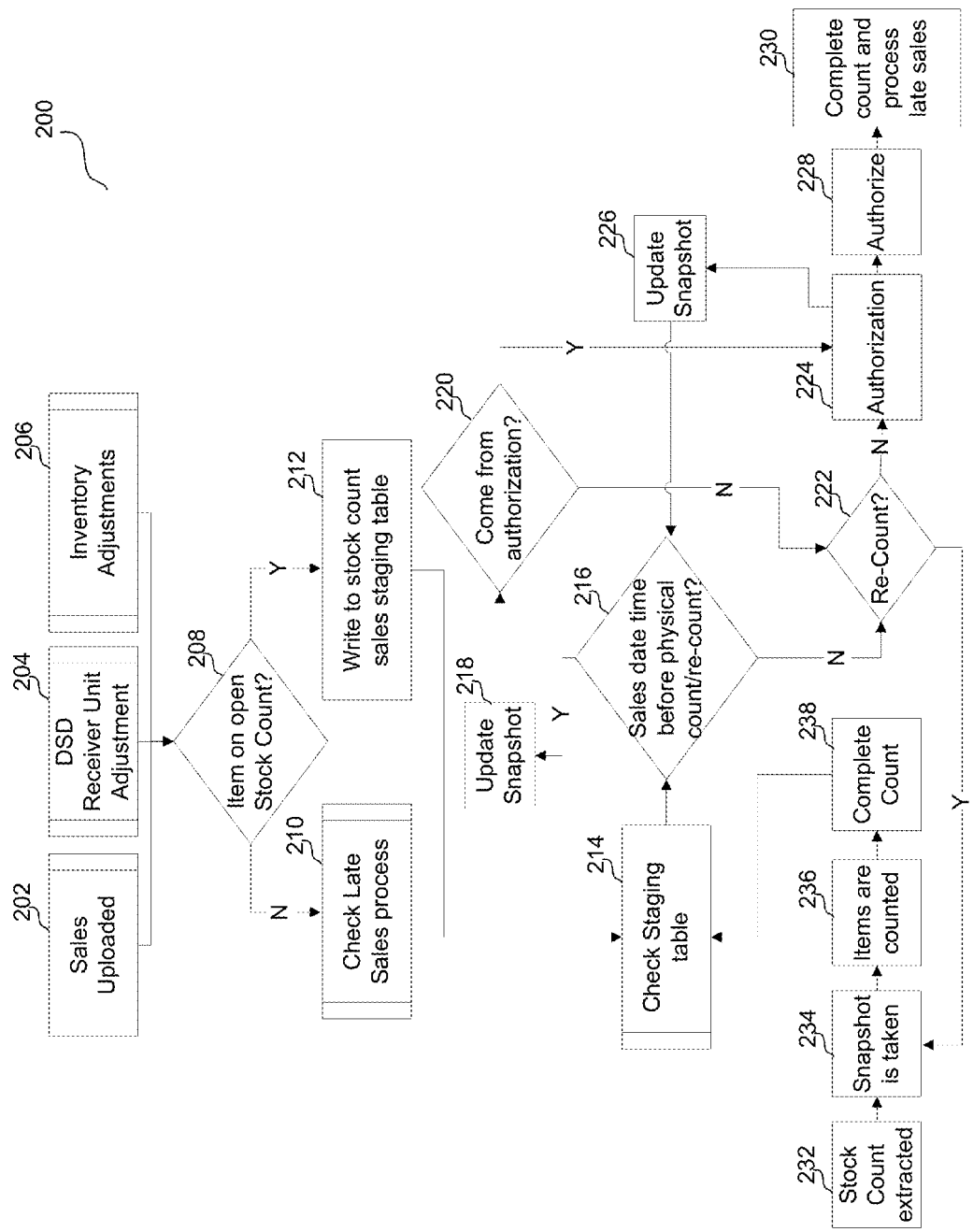
FIG. 2 is a flow diagram of the operation of the inventory management module of FIG. 1 when managing late transactions in accordance with embodiments of the present invention.

FIG. 2 shows a flow diagram 200 of the operation of the inventory management module 16 of FIG. 1 when managing late transactions in accordance with embodiments of the present invention. In one embodiment, the functionality of the flow diagram of FIG. 2 (and FIG. 4, described below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 232, the inventory management process begins by extracting a stock count from an accounting system.

At 234, a snapshot of the stock count is taken. This snapshot reflects the count values as recorded in the accounting system at the moment the snapshot is taken.

At 236, physical counting of the items on the shelves is performed. The physical counting process may take an extended period of time due to physical limitations or the volume of the stocked goods. Therefore, while the physical counting is being performed at 236, the inventory may change. For example, sales may be uploaded at 202, or a direct store delivery ("DSD") receiver unit adjustment may be performed at 204, or an inventory adjustment may be performed at 206.

At 208, each sale or adjustment record from 202, 204, or 206 is compared to every open stock count of the ongoing counting process that is being performed at 236. For example, when a sale or return happens in POS, the system checks if there are any open counts. If there are no corresponding open stock counts, at 210, that sale or adjustment is processed according to a late sales process. In one embodiment, a "late transaction" refers to a transaction that gets processed at a later point in time. For example, a "late sale" refers to a sales transaction that occurs before an authorized stock count but having an accounting process executed after the count is authorized. Since such transactions are counted into the physical count, it is necessary that no double counting takes place and the upstream system also needs to be aware. The upstream system may be a merchandizing system in charge of the evaluation of the inventory, an order management system, or any other system that displays a stock on hand value. In one embodiment, the late sales process is the processing of late sales transactions performed via a POS device.

Further, at 210, if there are no open counts and the last approved stock count date is after the sales transaction date, then a late sale will be recorded. If there are no open counts and the last approved stock count date is before the sales transaction date, then the inventory management system will update the stock on hand and late sales processing will not take place.

Further, at 208, if there is a corresponding open stock count for a sale or adjustment record from 202, 204, or 206, and if a snapshot of that stock count has been taken prior to the time of such sale or adjustment record, that sale or adjustment is written to a staging table at 212. A staging table (also referred to as a "staging area") is an intermediate storage area used for data processing during the extract, transform, and load ("ETL") process. The data staging area sits between the data source(s) and the data target(s), which are often data warehouses, data marts, or other data repositories. Data staging areas are often transient in nature, with their contents being erased prior to running an ETL process or immediately following successful completion of an ETL process. There are staging area architectures, however, which are designed to hold data for extended periods of time for archival or troubleshooting purposes.

The flow from 202, 204, and 206, through 210 and 212 continues until the counting process at 236 is completed at 238. Then, at 214, the staging table is checked for any sales or adjustments that were recorded during the counting process, and at 216, those records are checked to determine any discrepancies between corresponding accounting snapshots and completed physical counts. For example, it is determined whether the sales date times of the sales records in the staging table are before the times of their corresponding completed physical counts.

If there is no sales date time that is before the completion time of a corresponding physical count (or recount), at 222 it is determined whether a recount is needed. A recount may be needed when the inventory management system is set up to provide recount functionality and a discrepancy between book stock (e.g., the accounting stock as reflected in the accounting snapshots) and physical count stock is found. If there is a sales record date time that is before the completion time of a corresponding physical count or recount, at 218 a corresponding snapshot is updated to reflect that sales record.

After updating the snapshot at 218, at 220 it is determined whether the authorization phase has been previously reached or not. If the authorization phase has been previously reached, the process proceeds again to authorization at 224. Otherwise, at 222 it is determined whether a recount is needed. If a recount is needed, the process loops back to 234. Otherwise, the process proceeds to the authorization phase at 224.

At 224, a user is requested, via a user interface, to authorize the counts. After reaching the authorization phase, the user can choose to update the snapshot at 226. For example, an "Update Snapshot" button may be provided to the user via a user interface to indicate so. If the user chooses to update the snapshots, the process loops back to 216. Otherwise, the process proceeds to the final authorization at 228.

At 228, stock counts are finally authorized, and at 230, the user is allowed to manually choose whether or not to apply any remaining unprocessed late records, and the counts are completed and any remaining late sales are processed accordingly.

As shown in FIG. 2, one embodiment allows sales and inventory adjustments to be written in a staging table that is only processed when the user completes a stage of the stock count, such as count, re-count, and authorize. Accordingly, this embodiment does not stop users from counting or working on a stock count since it is built directly into the process of moving stock count between such stages.

Further, this embodiment is more system resource efficient compared to some other known solutions. In some known solutions, each sale or adjustment record is compared to every open stock count and then the stock count is updated for that item. In another known solution, the inventory management system waits until the count is finished before processing any inventory transactions that impact current stock on hand positions. Yet another known solution is to count only after the store is closed or during weekends, evening, etc. However, in this embodiment, the item is first "attached" to a corresponding open stock via a staging table, and discrepancy processing only takes place when the stock count enters a workflow and is already processing all items that are potentially subject to change at that time. Accordingly, this embodiment reduces the processing time of sales, thus keeping current inventory positions closer to real-time. One embodiment may further allow a user to manually choose, during the final authorization phase, whether or not to apply any remaining unprocessed late records.

In one embodiment, a system parameter in the stock count sales processing file may be used to determine whether the file includes transaction time stamps. If the file is indicated to include timestamps, a retail sales audit process will start providing transaction time stamps in the store time zone. In one embodiment, a parameter may be enabled to determine whether the file will have date time stamps in Greenwich Mean Time ("GMT") or in store time zone. In one embodiment, for retail sales audit implementation, the file is set to include time stamps, but GMT for sales data batch is disabled, i.e., time stamps are in store time zone.

With known solutions, retail sales audit sales processing may be unable to process all the sales records for a single store within an acceptable timeframe since a large portion of this processing is due to "heavy lifting" stock count processing. In contrast, embodiments allow for a change to be made to the way late sales are processed in order to improve the performance of late sales processing in retail sales audit process. This embodiment achieves faster stock count processing as well as faster late sales processing. In one embodiment, if there is at least one open stock count, retail sales audit writes the sale record to the staging table for every stock count that is open but only if the snapshot has already been taken for that open count. If there are no open counts and the last approved stock count date is after the sales transaction date, then a late sale will be recorded. If there are no open counts and the last approved stock count date is before the sales transaction date, then the inventory management system will update the stock on hand and late sales processing will not take place.

With some known solutions, when retail sales audit runs, the snapshot is updated during the count, recount, and authorization phases. In contrast, in embodiments, when retail sales audit runs, a record will be written to the stock count indicating what the sales record is. Then, the snapshot will get updated before discrepancy checks take place for each of the stock count phases. For example, when going from count to recount, the snapshot gets updated. When going from recount to authorize, the inventory management system automatically updates the snapshot before doing discrepancy check. During the authorization stage, the user can choose to update the snapshot.

In one embodiment, when confirming a count or recount, sales records will be loaded and processed prior to the inventory management system performing the discrepancy calculations. Sales records that meet the criteria will have their snapshot value updated. Sales records will then be marked as processed. When the user confirms the count or recount, meaning all child counts have been confirmed, sales records will be loaded and processed after the confirmation is done, treating the stock count as a closed count and writing a reversal stock movement history record.

Figure 3:
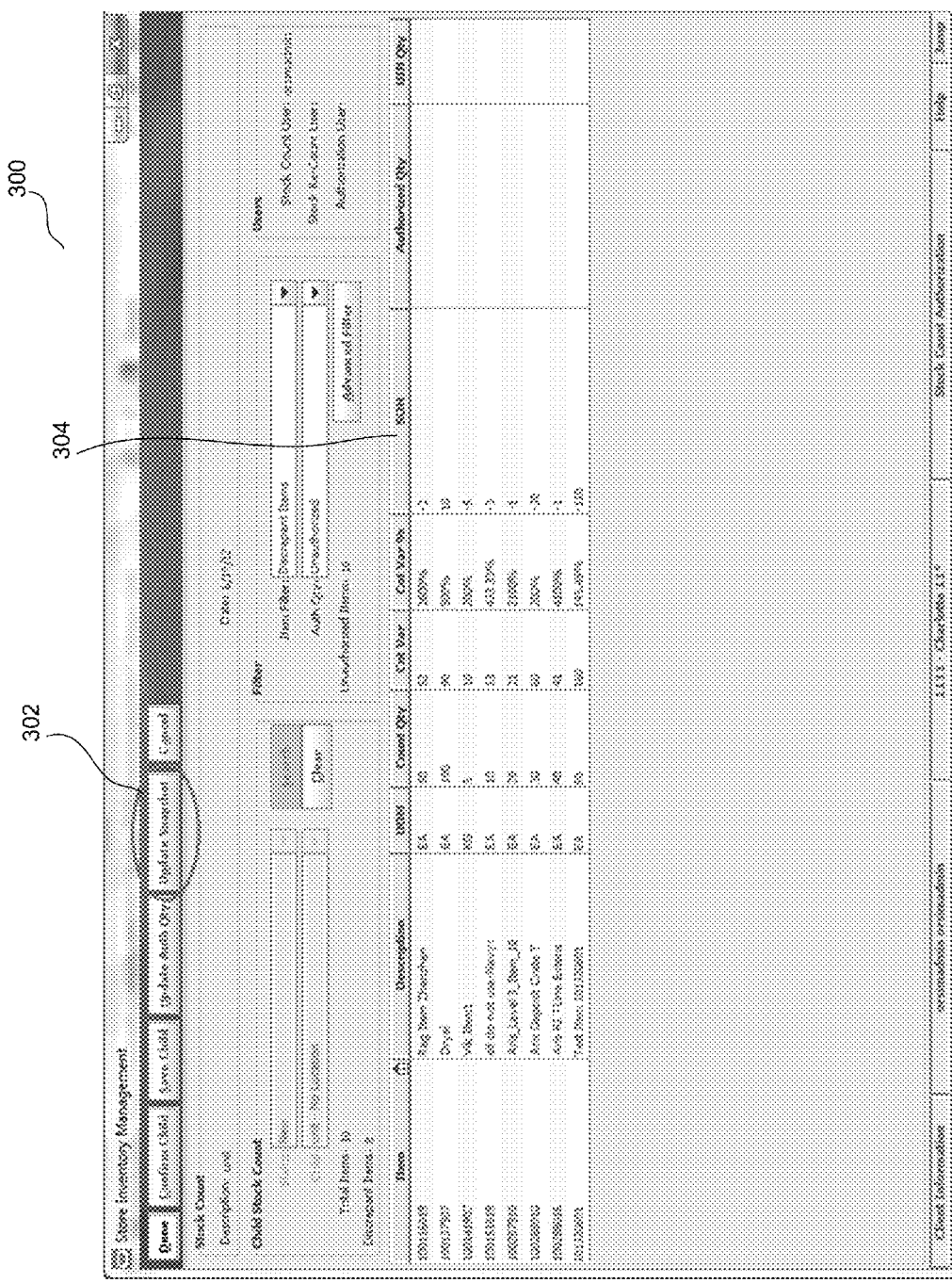
FIG. 3 is a screenshot of a user interface during the operation of the inventory management module of FIG. 1 when managing late transactions in accordance with embodiments of the present invention.

FIG. 3 is a screenshot 300 of a user interface during the operation of the inventory management module of FIG. 1 when managing late transactions in accordance with one non-limiting embodiment of the present invention. As shown in FIG. 3, and as described herein with reference to FIG. 2 at 224 and 226, the "Update Snapshot" button 302 is added to the authorization screen. When pressed, the inventory management system will process any unprocessed sales records and update the snapshot where appropriate. The records will be processed before the count is confirmed. The inventory management system will then refresh the information on the screen bringing the stock count update to date. Accordingly, this functionality separates the update of the stock count values from the retail sales audit sales processing. Pressing this button will update the snapshot based on any late sales that came in during the authorization stage. If the "Update Snapshot" button 302 is not selected before confirming the stock count and late sales need to be applied, a reversal stock movement history record will be created to reverse the late sale upon confirmation of the count.

In one embodiment, selecting the "Update Snapshot" button 302 will update the stock count with any late sales that were uploaded since entering the authorization stage. This will update the snapshot and, in turn, mark an item as discrepant or non-discrepant based on the update. The stock on hand field 304 will reflect the updated snapshot. Each time the user selects this button 302, the stock on hand field 304 will refresh.

In one embodiment, selecting the "Update Snapshot" button 302 will apply to all items on the count regardless of what the user has highlighted on the screen. The user is then prompted with a message "Are you sure you want to save your authorized quantities and apply late transactions to the stock count child?" Selecting yes will process any sales and update the snapshot accordingly. The user will be returned to the Stock Count Authorization screen. In one embodiment, selecting yes does not confirm the master count or child count. Selecting no will return the user to the Stock Count Authorization screen without making an update.

In one alternative embodiment, any functionality described herein with reference to FIG. 3 and provided upon an activation of the "Update Snapshot" button 302 may be provided automatically upon receiving a notification relating to an inventory adjustment. For example, when a notification of an inventory adjustment is received from an external or internal source, the inventory management system will process any unprocessed sales records and update the snapshot where appropriate. The records will be processed before the count is confirmed. The inventory management system will then refresh the information on the screen bringing the stock count update to date. An example of an external source is radio-frequency identification ("RFID") which may be used in a counting process. RFID uses electromagnetic fields to transfer data to identify and track tags attached to objects.

In one embodiment, since the snapshot only needs updating at the time of movement to the next stock count phase, the late sales processing is a staged process rather than a live update of the snapshot during the sales processing. For example, and referring again to FIG. 2 at 216 and 218, if the stock count sales processing is set to be performed daily and the stock count default time frame is set to be before the store opens and a sales record date is greater than the stock count date, then:

if stock count child is less than an authorization threshold, and if a NULL value is indicated for the item authorized quantity ("NULL" indicates that no count has been performed), then the snapshot value is updated and discrepancies between accounting and physical counts are calculated.

A stock count child is the stock count for a logical/workable unit of stock (e.g., a department or a location at a store). A stock count can have a discrepancy percentage/unit threshold set up such that if the count value is within this tolerance then the count can be processed, meaning the snapshot can be updated and the item can be moved on to the next phase of the count process (e.g., completion).

Further, and still referring to FIG. 2 at 216 and 218, if the stock count sales processing is set to be performed daily, the stock count default time frame is set to be after the store closes, and the sales record date is less than or equal the stock count date, then:

if stock count child is less than an authorization threshold, and if a NULL value is indicated for the item authorized quantity, then the snapshot value is updated and discrepancies between accounting and physical counts are calculated.

In one embodiment, where the stock count sales processing is set to include timestamp processing, a physical timestamp (i.e., the time the item is physically counted in the store) is captured when an item is counted, and the following functionality is provided:

The physical timestamp is copied to an authorization timestamp when the stock count is moved to the authorization stage, for example, at 224 of FIG. 2.

The authorization timestamp is updated to reflect the new timestamp when the authorized quantity is changed by the user, for example, at 224 or 228 of FIG. 2.

If the authorization timestamp is greater than or equal to a sales record time, for example, at 216 of FIG. 2, the snapshot is updated and inventory adjustment is performed, for example, at 218 of FIG. 2.

If a sales record in the staging table does not update the snapshot, the sales record is left for the next step in the process, for example, moving from count to re-count, moving from re-count or count to authorize, or pressing the "Update Snapshot" button 302 of FIG. 3. All records are deleted when the late sales process runs after the stock count is authorized, for example, at 228 of FIG. 2.

In one embodiment, when an inventory adjustment is created and approved during a stock count, and consequently, a record is written to the staging table, the "reason code" in this table will display the "reason code" the user selected when creating the inventory adjustment. During the authorization phase, and referring again to FIG. 2 at 224, the user can press a "Complete" button to determine if there are any pending inventory adjustments needing approval which have items existing on the stock count.

In one non-limiting embodiment, when the user confirms the count, the system will check any "In Progress" inventory adjustments and determine if there are any items that are on the open stock count which the user is attempting to complete.

If there are existing "In Progress" inventory adjustments with items on the stock count and the Store parameter, the user is asked for stock count authorization for late inventory adjustment. If the user answers yes to stock count authorization, then a warning message is displayed: "There are in progress inventory adjustments with items on this stock count. Do you want to continue?" If the user answers yes, the "In Progress" inventory adjustments are ignored. If the user answers no, the user is brought back to the stock count screen to resolve the "In Progress" inventory adjustments. If the user answers no to stock count authorization, then any open "In Progress" Inventory Adjustments are ignored.

If in confirming/approving inventory adjustments, the user responds yes, then a warning message is displayed: "One or more items in this inventory adjustment are on an open stock count. Do you want to update the stock count?" If the user answers yes, the inventory adjustment is written to the staging table for late inventory adjustment processing. If the user answers no, the inventory adjustments do not get written to the staging table and will be ignored by the stock count. If in confirming/approving inventory adjustments, the user responds no, then no message is displayed and the inventory adjustment is always written to the staging table for late inventory adjustment processing.

In one embodiment, when processing the inventory adjustments from the staging table, the system uses the same criteria used for late sales processing (i.e., creation time stamp of the inventory adjustment), except that the inventory adjustment timestamp is used in place of the sales timestamp.

In one embodiment, when confirming a count, inventory adjustment records that meet the criteria will have their snapshot value updated. Records will then be marked as "processed" in the staging table. When the user confirms the count, meaning all child counts have been confirmed, inventory adjustment records will be loaded and processed after the confirmation is done, treating the stock count as a closed count, writing a reversal stock movement history record, and writing inventory adjustment records to the staged message table using the following non-limiting "reason codes":

184 Unit Late Inventory Adjustment Increase, +Stock On Hand

185 Unit Late Inventory Adjustment Decrease, −Stock On Hand

186 Unit and Amount Late Inventory Adjustment Increase, +Stock On Hand

187 Unit and Amount Late Inventory Adjustment Decrease, −Stock On Hand

The reason codes identify an increase or decrease of inventory and if the count is a cycle count or an annual financial count. This allows financial tracking of why a sales/return record is being backed out after it was counted.

Figure 4:
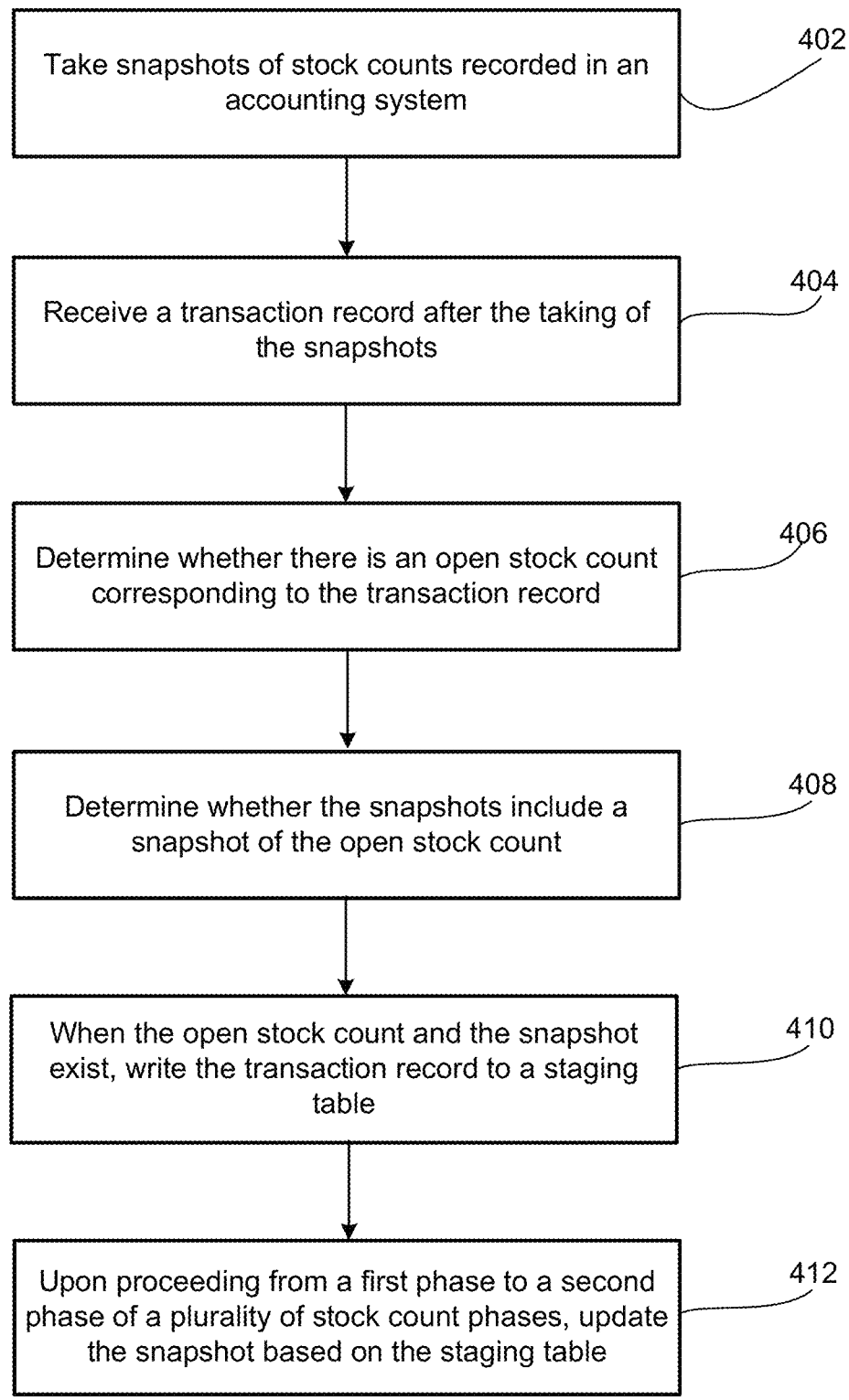
FIG. 4 is another flow diagram of the operation of the inventory management module of FIG. 1 when managing late transactions in accordance with embodiments of the present invention.

One embodiment provides updates to unique identification number ("UIN") during stock count for inventory adjustments, sales, and returns. For example, and referring again to FIG. 2 at 214 and 216, for count phase increase, if a record is determined to be late and meets the following criteria, then the count quantity is increased by 1 and UIN is checked as counted:

It is determined to increase the snapshot
UIN exists on the stock count
UIN is not yet counted For recount phase increase, if a record is determined to be late and meets the following criteria, then the count quantity is increased by 1 and UIN is checked as counted:

It is determined to increase the snapshot
UIN exists on the stock count
UIN is not yet recounted
Item is already counted For count phase decrease, if a record is determined to be late and meets the following criteria, then the count quantity is decreased by 1 and UIN is unchecked as counted:

It is determined to decrease the snapshot
UIN exists on the stock count
UIN is already counted For recount phase decrease, if a record is determined to be late and meets the following criteria, then the count quantity is decreased by 1 and UIN is unchecked as counted:

It is determined to decrease snapshot
UIN exists on the stock count
UIN is already recounted FIG. 4 is a flow diagram of inventory management module 16 of FIG. 1 when managing late transactions in accordance with embodiments of the present invention.

At 402 snapshots are taken from stock counts recorded in an accounting system. For example, during a retail sales audit process, snapshots of stock counts stored by an accounting system are taken before a physical counting process begins. In one embodiment, the physical counting may also be performed in a recount phase of a counting process.

At 404, a transaction record is received. The transaction record may be received during the counting process since a physical count may take a period of time due to physical limitations and the large volume of an inventory. For example, if the physically counting process happens during store business hours, customers may purchase items, resulting in such transaction records being received. A transaction record may be received from a POS device.

At 406, it is determined whether there is an open stock count corresponding to the transaction record, i.e., the item for which the transaction record is received corresponds to a stock that is being physically counted.

At 408, it is determined whether the snapshots that were last taken from the stock counts recorded in the accounting system include a snapshot of the open stock count which corresponds to the received transaction record.

When the open stock count and the snapshot exist, at 410, the transaction record is written to a staging table. In effect, at 410, the received transaction record is "attached" to the corresponding open stock count without yet affecting the snapshots that have been taken from the stock counts.

Then, at 412, as the counting process continues, upon proceeding from one phase to a different phase of the stock count process, the snapshot is updated based on the staging table. Stock count phases may include a count phase, a recount phase, and an authorize phase. Hence, the snapshots are updated when, for example, going from the count phase to the recount phase, or from either the count or recount phase to the authorize phase.

As disclosed, embodiments provide late transaction processing where snapshots are updated during store open hours and upon moving from one stock count phase to another. This gives the end user the possibility of having close-to-live updates on the snapshots while avoiding excessive processing and repeated user lockouts. Embodiments do not stop users from counting or working on a stock count since they are built directly into the process of moving stock counts between stages. Further, embodiments are more system resource efficient since each sale or adjustment record is simply "attached" to the open stock and processing only takes place when the stock count enters a workflow and is already processing all items. This significantly reduces the processing time of sales, thus keeping current inventory positions closer to real-time. Embodiments further allow a user to manually choose, during the final authorization phase, whether or not to apply any remaining unprocessed late records.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-readable non-transitory medium having instructions stored thereon that, when executed by a processor, cause the processor to perform inventory management for late transaction processing, the performing comprising:

taking snapshots of stock counts recorded in an accounting system;

completing a sales transaction;

receiving a transaction record indicating the sales transaction has occurred after the taking of the snapshots;

determining whether there is an open stock count for a stock item corresponding to the transaction record, wherein the open stock count comprises an ongoing physical count of the stock item;

determining whether the snapshots include a snapshot of the open stock count;

when the open stock count and the snapshot exist, writing the transaction record to a staging table; and upon proceeding from a first phase to a second phase of a plurality of stock count phases, updating the snapshot based on the staging table, wherein the plurality of stock count phases include a count phase, a recount phase, and an authorize phase.

2. The computer-readable non-transitory medium of claim 1, wherein the transaction record is recorded via a point of sale device or generated according to an inventory adjustment.

3. The computer-readable non-transitory medium of claim 1, wherein, when there are no open stock counts, the performing further comprises:

determining that a last approved stock count date is after a transaction date of the transaction record; and recording a late transaction corresponding to the transaction record.

4. The computer-readable non-transitory medium of claim 1, wherein, when there are no open stock counts, the performing further comprises:

determining that a last approved stock count date is before a transaction date of the transaction record; and updating a stock on hand count according to the transaction record.

5. The computer-readable non-transitory medium of claim 1, wherein the performing further comprises:

during the authorize phase, updating the snapshot upon an activation of a button by a user via a user interface or upon receiving a corresponding notification.

6. The computer-readable non-transitory medium of claim 1, wherein the updating further comprises:

determining whether a daily transaction processing is performed;

when the daily transaction processing is performed, determining whether a stock count time frame is before or after a corresponding store opens;

updating the snapshot and determining discrepancies when:

the stock count time frame is before the store opens and a transaction date of the transaction record is greater than a stock count date, or the stock count time frame is after the store opens and the transaction date of the transaction record is less than or equal to the stock count date.

7. The computer-readable non-transitory medium of claim 1, wherein the performing further comprises:

capturing a physical timestamp corresponding to the transaction record;

when moving to the authorize phase, copying the physical timestamp to an authorization timestamp;

when the authorization timestamp is greater than or equal to a time of the transaction record, updating the snapshot and processing a corresponding inventory adjustment; and when an authorized quantity is changed via a user interface, updating the authorization timestamp accordingly.

8. A method of inventory management for late transaction processing, the method comprising:

taking snapshots of stock counts recorded in an accounting system;

completing a sales transaction;

receiving a transaction record indicating the sales transaction has occurred after the taking of the snapshots;

determining whether there is an open stock count for a stock item corresponding to the transaction record, wherein the open stock count comprises an ongoing physical count of the stock item;

determining whether the snapshots include a snapshot of the open stock count;

when the open stock count and the snapshot exist, writing the transaction record to a staging table; and upon proceeding from a first phase to a second phase of a plurality of stock count phases, updating the snapshot based on the staging table, wherein the plurality of stock count phases include a count phase, a recount phase, and an authorize phase.

9. The method of claim 8, wherein the transaction record is recorded via a point of sale device or generated according to an inventory adjustment.

10. The method of claim 8, wherein, when there are no open stock counts, the method further comprises:

determining that a last approved stock count date is after a transaction date of the transaction record; and recording a late transaction corresponding to the transaction record.

11. The method of claim 8, wherein, when there are no open stock counts, the method further comprises:

determining that a last approved stock count date is before a transaction date of the transaction record; and updating a stock on hand count according to the transaction record.

12. The method of claim 8 further comprising:

during the authorize phase, updating the snapshot upon an activation of a button by a user via a user interface or upon receiving a corresponding notification.

13. The method of claim 8 further comprising:

determining whether a daily transaction processing is performed;

when the daily transaction processing is performed, determining whether a stock count time frame is before or after a corresponding store opens;

updating the snapshot and determining discrepancies when:

the stock count time frame is before the store opens and a transaction date of the transaction record is greater than a stock count date, or the stock count time frame is after the store opens and the transaction date of the transaction record is less than or equal to the stock count date.

14. The method of claim 8 further comprising:

capturing a physical timestamp corresponding to the transaction record;

when moving to the authorize phase, copying the physical timestamp to an authorization timestamp;

when the authorization timestamp is greater than or equal to a time of the transaction record, updating the snapshot and processing a corresponding inventory adjustment; and when an authorized quantity is changed via a user interface, updating the authorization timestamp accordingly.

15. An inventory management system for performing inventory management for late transaction processing, the system comprising:

a processor configured to execute a collection of software modules, wherein the processor is further configured, when executing the collection of software modules, to:

take snapshots of stock counts recorded in an accounting system;

complete a sales transaction;

receive a transaction record indicating the sales transaction has occurred after the taking of the snapshots;

determine whether there is an open stock count for a stock item corresponding to the transaction record, wherein the open stock count comprises an ongoing physical count of the stock item;

determine whether the snapshots include a snapshot of the open stock count;

write, when the open stock count and the snapshot exist, the transaction record to a staging table; and update, upon proceeding from a first phase to a second phase of a plurality of stock count phases, the snapshot based on the staging table, wherein the plurality of stock count phases include a count phase, a recount phase, and an authorize phase.

16. The system of claim 15, wherein the transaction record is recorded via a point of sale device or generated according to an inventory adjustment.

17. The system of claim 15, wherein, when there are no open stock counts the processor is further configured, when executing the collection of software modules, to:
   determine that a last approved stock count date is after a transaction date of the transaction record; and
   record a late transaction corresponding to the transaction record.

18. The system of claim 15, wherein, when there are no open stock counts the processor is further configured, when executing the collection of software modules, to:
   determine that a last approved stock count date is before a transaction date of the transaction record; and
   update a stock on hand count according to the transaction record.

19. The system of claim 15, wherein during the authorize phase the processor is further configured, when executing the collection of software modules, to update the snapshot upon an activation of a button by a user via a user interface or upon receiving a corresponding notification.

20. The system of claim 15, wherein the processor is further configured, when executing the collection of software modules, to determine whether a daily transaction processing is performed;
   when the daily transaction processing is performed, whether a stock count time frame is before or after a corresponding store opens;
   discrepancies when the stock count time frame is before the store opens and a transaction date of the transaction record is greater than a stock count date, or the stock count time frame is after the store opens and the transaction date of the transaction record is less than or equal to the stock count date.

* * * * *